United States Patent [19]

Crawford

[11] 3,966,337

[45] June 29, 1976

[54] MODULAR POST AND BEAM JOINT

[76] Inventor: Elsie Crawford, 743 S. Curson, Los Angeles, Calif. 90036

[22] Filed: Apr. 18, 1975

[21] Appl. No.: 569,268

[52] U.S. Cl. ............................. 403/170; 403/347; 403/382; 312/257 R
[51] Int. Cl.² ...................... F16D 1/00; F16D 3/00
[58] Field of Search ........... 403/231, 346, 347, 382, 403/403; 312/257 R, 140

[56] References Cited
UNITED STATES PATENTS

| | | | |
|---|---|---|---|
| 2,097,172 | 10/1937 | Yurkovitch | 403/347 X |
| 2,354,054 | 7/1944 | Plym | 403/346 X |
| 3,847,460 | 11/1974 | Weidt | 312/257 R |

Primary Examiner—Werner H. Schroeder
Assistant Examiner—Wayne L. Shedd
Attorney, Agent, or Firm—William W. Haefliger

[57] ABSTRACT

A modular post and beam joint includes slidably and tightly interfitting transverse beam members and primary and secondary post members. The latter define slots receiving the interfitting transverse beam members, as well as fingers which project endwise oppositely at the four corners defined by the transverse beam members.

3 Claims, 5 Drawing Figures

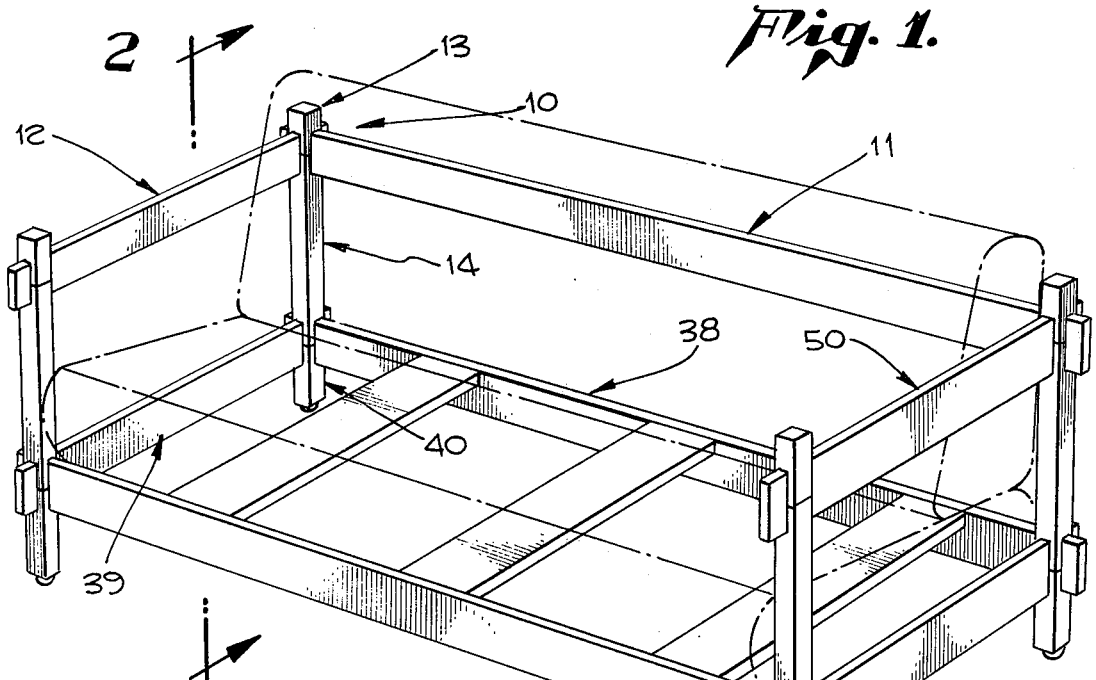
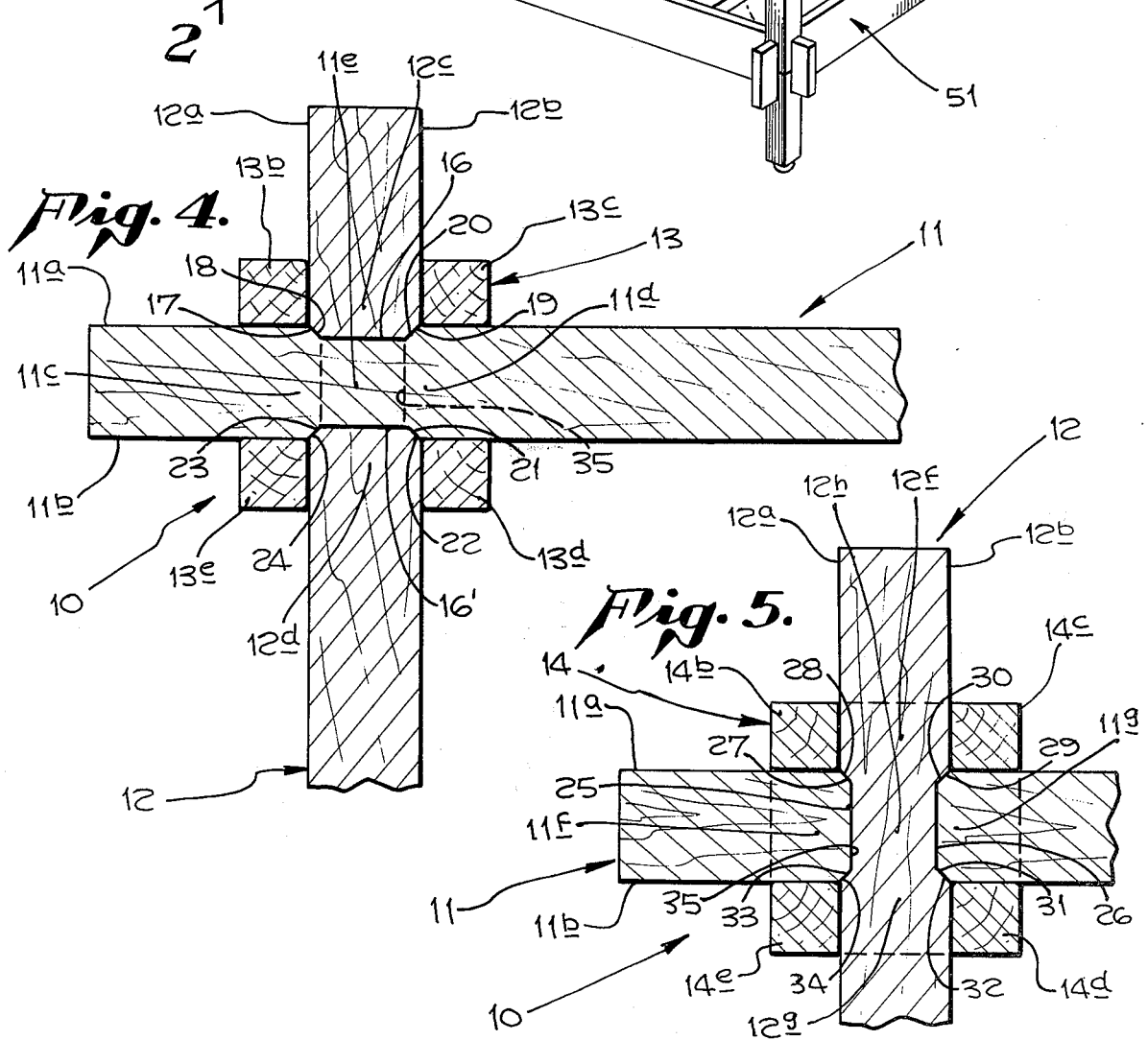

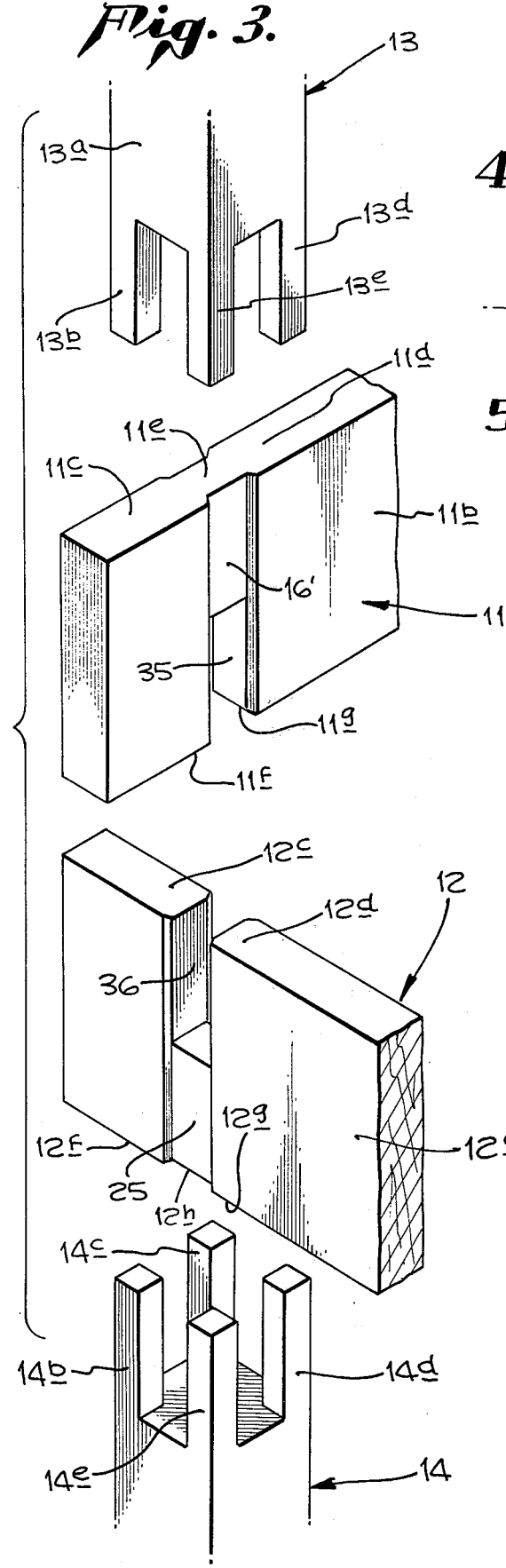
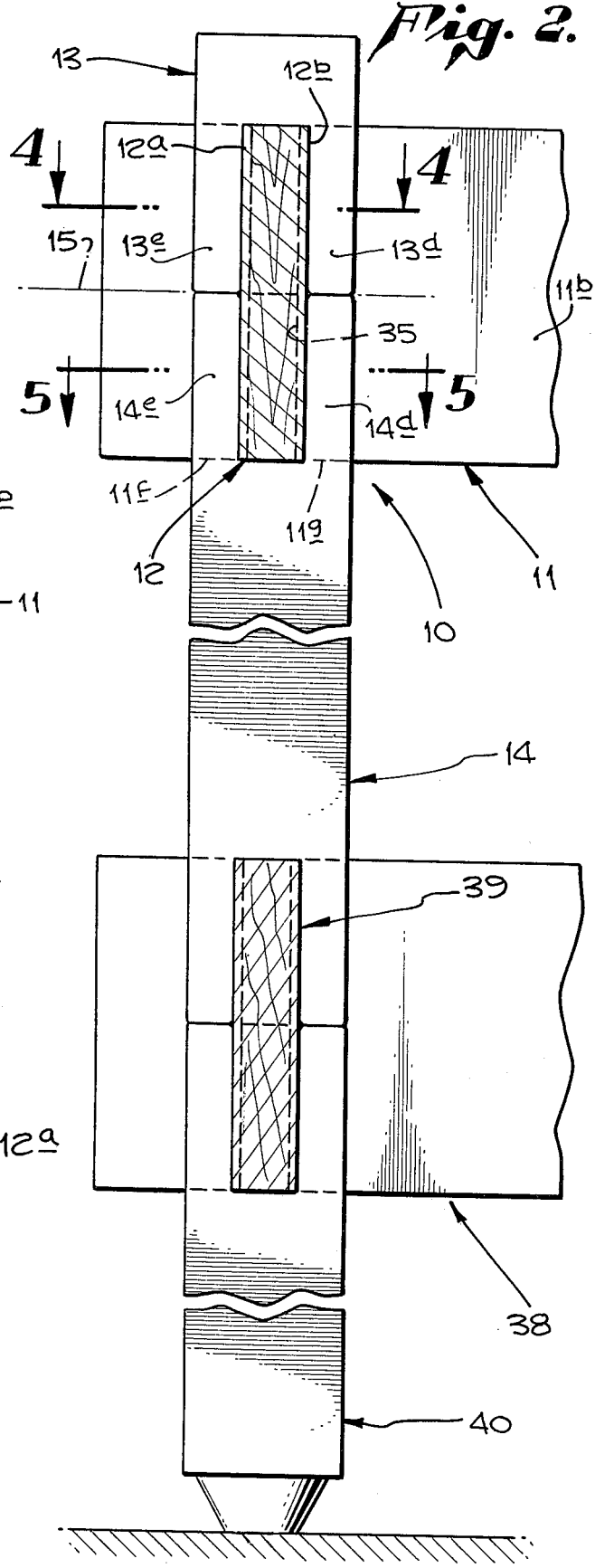

3,966,337

MODULAR POST AND BEAM JOINT

BACKGROUND OF THE INVENTION

This invention relates generally to furniture construction, and more specifically concerns modular joint structures enabling rapid and efficient assembly of furniture elements.

In the recent past, a substantial and growing need has developed for sturdy, moderately priced furniture, capable of assembly by the user or purchaser. Such furniture should furthermore be attractive and be capable of assembly with few or no tools. While efforts have been made to meet this need, no furniture elements of which I am aware incorporate the unusually advantageous construction, modes of assembly and results as are now afforded by the present invention.

SUMMARY OF THE INVENTION

Basically, the invention is embodied in a modular post and beam joint, and comprising two transverse beam members that define an intersection providing four vertically elongated corners, together with primary and secondary post members that have end portions which extend vertically endwise oppositely in interfitting relation with the beam members at the intersection. As will be seen, each end portion contains or defines transverse intersecting slots which closely receive the transverse beam members, the primary post member defining four fingers which project downwardly at the respective four corners, and the secondary post member defining four fingers which project upwardly at the respective four corners. The lengths of the fingers on the post members may be equal, and they may terminate at or adjacent to a common horizontal plane to provide visual continuity as well as maximum strength.

Further, the post members may be of selected lengths so that, for example, the primary or upper post member may define a cap, a lower or secondary post member may define a pedestal, and an intermediate post member or members may cooperate with the uppermost and lowermost post members, as well as transverse beam members, at multiple joints, as will be seen.

These and other objects and advantages of the invention, as well as the details of an illustrative embodiment, will be more fully understood from the following description and drawings, in which:

DRAWING DESCRIPTION

FIG. 1 is a perspective showing of furniture in which the invention is embodied, FIG. 2 is an enlarged vertical section on lines 2—2 of FIG. 1;

FIG. 3 is an exploded perspective showing of a joint as seen in FIGS. 1 and 2;

FIG. 4 is a horizontal section on lines 4—4 of FIG. 2; and

FIG. 5 is a horizontal section on lines 4—4 of FIG. 2.

DETAILED DESCRIPTION

Referring first to FIGS. 2–5, the post and beam joint 10 comprises first and second transverse beam members 11 and 12 defining an intersection with four corners which are elongated vertically. In FIGS. 4 and 5 the four corners are respectively defined by the pairs of faces 11a and 12a, 12b and 11a, 11b and 12b, and 12a and 11b of the transverse members.

Primary and secondary post members 13 and 14 are also provided. Member 13 includes a retangular cross section body 13a and an end portion defining four like fingers 13b–13e which extend vertically downwardly in sliding interfit relation with the faces 11a, 11b, 12a and 12b proximate the corners. Member 14 likewise includes a rectangular cross section body 14a and an end portion defining four like fingers or projections 14b–14e which extend vertically upwardly in sliding interfit relation with the faces 11a, 11b, 12a and 12b proximate the corners. Typically, the endwise opposite pairs of fingers i.e. 13b and 14b, 13c and 14c, 13d and 14d, and 13e and 14e, have equal and like cross sections and they have equal lengths which are approximately one-half the overall height dimension of each of the transverse beam members 11 and 12. Accordingly, the fingers terminate in contact, or near contact, at horizontal plane 15, as seen in FIG. 2.

It will further be noted in FIG. 4 that the fingers of post member 13 define two transverse slots to receive upper extents 11c, 11d, 12c and 12d of the transverse members. Those slots also intersect to receive a reduced width extent 11e of the member 11, and formed between inset walls 16 and 16' formed in opposite sides of the member 11. Note also that interengaged chamfers are formed on the members 11 and 12, i.e. at interengagement corner locations 17 and 18, 19 and 20, 21 and 22 and 23 and 24. The chamfers extend in vertical planes which bisect or approximately bisect the adjacent fingers. The overall construction is such as to firmly locate the members 11 and 12 relative to one another, independently of the post members, so that the latter may easily but closely and accurately interfit the transverse members.

Likewise, and referring to FIG. 5, the fingers of post member 14 define two transverse slots to receive lower extents 11f, 11g, 12f, and 12g of the transverse members. Those slots also intersect to receive a reduced width extent 12h of the member 12, and formed between inset walls 25 and 26 formed in opposite sides of member 12. Note also that interengaged chamfers are formed in members 11 and 12, i.e. at interengagement corner locations 27 and 28, 29 and 30, 31 and 32 and 33 and 34.

Note that notches 35 and 36 are formed by the members 11 and 12 to facilitate interlocking thereof, such notches being concealed inwardly of the fingers in assembled condition.

In FIGS. 1 and 2, the member 13 defines a cap which extends over and terminates above the transverse beam member intersection.

FIGS. 1 and 2 also show the provision of third and fourth transverse beam members 38 and 39 defining another intersection exactly like that described above in connection with FIGS. 2–5, but at a lower elevation. A third post member 40 is also provided, and the second and third post members 14 and 40 define fingers exactly like those defined by the first and second post members at the first described joint. Accordingly, any length composite post may be made up to have any member or like joints. In FIG. 1, post 40 defines a pedestal for the furniture, in which three additional and like posts are also employed. Note also transverse beam members 50 and 51.

The joint members as described preferably, but not necessarily, consist of hard wood enhancing smooth, sliding contact upon assembly into relatively tight interlocked condition, as well as capability for rapid disassembly whenever desired.

I claim:
1. In a modular post and beam joint, the combination comprising
   a. first and second transverse beam members defining an intersection with four corners which are vertically elongated, and
   b. primary and secondary post members having end portions which extend vertically endwise oppositely in interfitting relation with said beam members at said intersection,
   c. the primary post member end portion containing transverse slots which intersect so as to closely receive upper extents of said transverse beam members, and defining four fingers which project downwardly at said respective four corners,
   d. the secondary post member end portion containing transverse slots which intersect so as to closely receive lower extents of said transverse beam members, and defining four fingers which project upwardly at said respective four corners,
   e. said primary and secondary post member end portions having equal lengths, said primary post member end portion terminating in adjacent relation to the secondary post member end portion, the post members having sliding frictional interfit with the beam members,
   f. said first and second beam members containing vertically extending notches respectively receiving second and first beam member extents at said beam member intersection and concealed inwardly of said fingers, and
   g. said first and second beam members having chamfered surfaces that are interengaged inwardly of edges defined by said fingers, said chamfered interengaged surfaces holding said members in rigid assembled relation.

2. The combination of claim 1 wherein said primary post member defines a cap which extends over and terminates above said transverse beam member intersection.

3. The combination of claim 1 including third and fourth transverse beam members defining another intersection with four corners which are vertically elongated, said intersection spaced vertically from said first and second beam member intersection, and a third post member, the third and second post members also having other end portions which extend vertically endwise oppositely in interfitting relation with said third and fourth beam members at said intersection thereof, said other end portions being like the post member end portions as defined in claim 1.

* * * * *